Aug. 18, 1931.   M. M. ASSAEL   1,819,535
DECORATIVE PRODUCT
Filed April 17, 1930
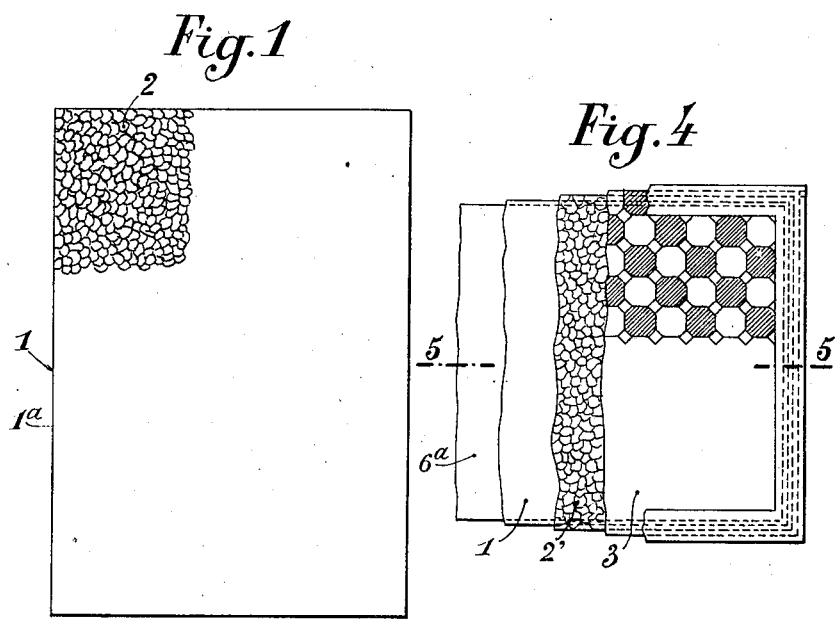
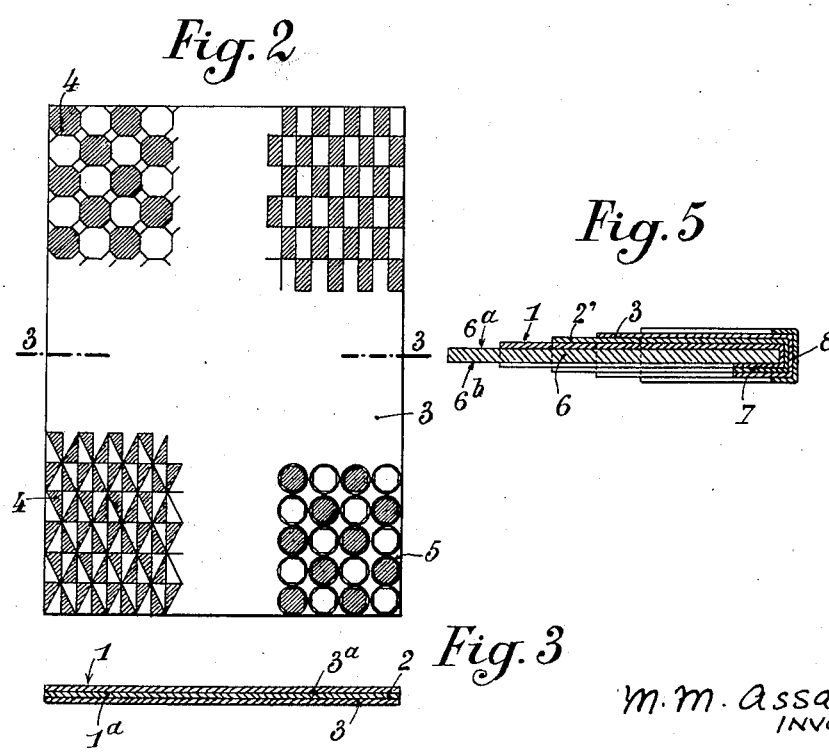

Patented Aug. 18, 1931

1,819,535

UNITED STATES PATENT OFFICE

MAURICE MOISE ASSAEL, OF PARIS, FRANCE

DECORATIVE PRODUCT      REISSUED

Application filed April 17, 1930, Serial No. 445,152, and in France March 12, 1930.

The present invention relates to a new decorative product, which may be used in sheets or slabs, and may be readily manufactured at a small expense, for giving the impression of a surface constellated with diamonds or gems, for use in jewelry, millinery, Paris articles or inlaid fancy articles, trades, etc.

According to the invention, my new decorative product is formed by superposition of two sheets or slabs of plastic matter or the like, between which is interposed any suitable substance comprising a very large number of very small bright facets, the top sheet or slab being transparent and painted with a varnish or other coloured transparent material, or decorated, by printing or otherwise, preferably on its inner surface, with designs showing the outlines of diamonds or gems of all colours, dimensions and cuts.

According to another characteristic of this invention, the bright faceted surface is formed with fine particles or reflecting flakes (pounded glass, metallic powders, chemicals, etc.) and is squeezed and set in two slabs of plastic matter which are submitted in course of manufacture to a suitable pressure, preferably with the aid of heat.

According to another method of manufacture, in the particular case where this product is to be prepared directly into a coating to be spread over any suitable article, the scintillating substance consists of a thin metallic sheet (tin or other), suitably creased in order to show a number of facets, said sheet being maintained between the two slabs of plastic matter, and the unit formed by the three sheets being set in any manner, around its edges, over the object to be coated. The creased metallic sheet may be replaced by a metallic varnish, with which the bottom sheet will be coated.

In the accompanying drawings, given solely by way of example:

Fig. 1 is a horizontal view of the bottom slab of plastic matter, covered with fine scintillating flakes;

Fig. 2 is a top view of a decorative sheet according to the invention, showing some of the shapes of diamonds or gems of which the transparent sheet gives the impression.

Fig. 3 is a section on line 3—3 of Fig. 2.

Fig. 4 is a horizontal view in fragmentary, section of an object, for example the lid of a box, decorated in accordance with this invention.

Fig. 5 is a section on line 5—5 of Fig. 4.

According to the construction shown in Figs. 1 to 3, the product in conformity with this invention is shown in the shape of a comparatively rigid slab, independent of all support, and easily handled.

Such slab comprises a bottom sheet 1. This sheet is made of any plastic matter, celluloid, galalithe, etc., (transparent or not) or of non-inflammable plastic matter. The slab is coated, as shown in Fig. 1, over its top, inner face 1a with fine particles 2 of any bright faceted material (pounded glass, metallic powder, chemicals, etc.). This material is spread as uniformly as possible over surface 1a by any means, mechanical or not. Material 2 is covered with a second sheet 3 also made of plastic matter. Sheet 3 is transparent and is provided over one of its faces, preferably its inner face 3a with suitable designs 4. Such designs, previously obtained by any means (by hand or mechanically) and with the use of a varnish or other suitable transparent material, show in colour the outlines of gems of all dimensions, colours and cuts (gauged stones, cabochons, rounds, ovals, etc.), the gaps between coloured parts showing the usual shapes of diamonds.

Fig. 2 shows in top view several possible aspects of sheet 3. For instance, octagons can be seen on the top left hand corner, rectangles in the right corner, triangles in the left bottom corner, which form rhombus by their juxtaposition. In this figure, the shaded polygons correspond for instance to coloured stones, while the blank polygons correspond to diamonds.

Both sheets 1 and 3 are submitted in course of the preparation of the product, to a certain pressure, preferably with the aid of heat, so as to set powdered material 2 in the sheets. The product thus obtained is a unitary slab. The outer surface is polished by any of the usual processes.

The herein described product, suitably illuminated and seen from the top face of sheet 3, gives the impression of a constellated-surface set with diamonds and gems.

When it is found desirable to obtain the impression imparted by mounted or set gems, a line 5 or gilt or silvered dots is painted or drawn around each design (bottom corner of Fig. 2).

The product thus obtained is inexpensive, as its preparation is most simple and rapid. From the point of view of appearance, it competes easily with the various known processes of inlaying, which are very long to manufacture and thereby extremely costly. It may be prepared in large slabs, easily cut up. Its applications are innumerable: jewelry, millinery, Paris articles, inlaid fancy articles, trades; etc.

In Figs. 4 and 5 is shown an application of the product according to the invention, to the coating of any kind of articles.

According to this construction, an article 6 is covered with a sheet 1 of plastic or semi-plastic matter. On said sheet is placed a sheet 2' of metal (tin for instance) suitably creased in order to show a large number of reflecting facets. Over this sheet is placed a second sheet 3 of transparent plastic matter, previously painted as in the foregoing example, preferably over its surface which is in contact with the metallic sheet 2'. The combination of the three sheets 1, 2' and 3 is set along its edges, in any known manner, on to the part or article 6; the surface 6a thereof which is to be coated may be plane, curved or even polyhedral. Edges 7, as shown, may be folded under bottom face 6b of article 6 which may be, for instance, the lid of a box. Securing of folded edge 7 is performed in any suitable manner, for instance by means of a U-shaped iron fitting 8.

The result thus obtained conveys an impression similar to that of the slab shown in Figs. 2 and 3.

Obviously, this invention is in no way restricted to the constructions illustrated and described, which are only shown by way of example.

Having now described my invention what I claim as new and desire to secure by Letters Patent is:

1. A decorated object comprising a core member, a sheet of plastic material covering said member, a creased thin metallic sheet covering said plastic sheet, a sheet of transparent plastic material covering said metallic sheet, the edges of said sheets being folded over the edges of said core member, and a U-shaped fitting for clamping said folded edges over said core member.

2. A decorative product comprising two laminæ of material which is transparent and plastic at ordinary temperature and under a predetermined pressure and an intermediate layer of material pressed and firmly held between the laminæ and having small bright facets, the inner surface of the upper lamina being provided with designs showing the outline of cut precious stones, the layer of the intermediate material being thin in order that the whole mass of the latter is embedded in the plastic material under the effect of the pressure which also acts to unite the two laminæ and the material.

3. A product as claimed in claim 2, wherein the design on the inner surface of the upper layer consists of a tracing simulating precious metal following a predetermined outline of a desired cut gem.

4. A product as claimed in claim 2, wherein the design on the inner surface of the upper layer is printed and portions are colored differently to represent differently colored stones.

5. A product as claimed in claim 2, wherein the intermediate material is in the form of powdered glass which coacts with the two layers to facilitate the uniting thereof when pressure is applied to the same.

6. A decorative product as claimed in claim 2 wherein the intermediate material consists of metallic powders.

7. A decorative product as claimed in claim 2, wherein each design representing a precious stone is surrounded by a line representing the setting of the stone.

In testimony whereof I have signed my name to this specification.

MAURICE MOISE ASSAEL.